US010740031B2

(12) United States Patent
Zheng et al.

(10) Patent No.: US 10,740,031 B2
(45) Date of Patent: Aug. 11, 2020

(54) INTERFACE SCHEDULER FOR A DISTRIBUTED MEMORY SYSTEM

(71) Applicant: INTERNATIONAL BUSINESS MACHINES CORPORATION, Armonk, NY (US)

(72) Inventors: Jie Zheng, Poughkeepsie, NY (US); Stephen J. Powell, Austin, TX (US); Steven R. Carlough, Poughkeepsie, NY (US); Susan M. Eickhoff, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/140,780

(22) Filed: Sep. 25, 2018

(65) Prior Publication Data

US 2020/0097214 A1     Mar. 26, 2020

(51) Int. Cl.
*G06F 13/16* (2006.01)
*G06F 3/06* (2006.01)
*G06F 13/40* (2006.01)

(52) U.S. Cl.
CPC ........... *G06F 3/0659* (2013.01); *G06F 3/061* (2013.01); *G06F 3/067* (2013.01); *G06F 13/161* (2013.01); *G06F 13/1689* (2013.01); *G06F 13/4022* (2013.01)

(58) Field of Classification Search
CPC .............................. G06F 13/161; G06F 3/0659
See application file for complete search history.

(56) References Cited

U.S. PATENT DOCUMENTS

| 9,201,817 | B2 | 12/2015 | Chu et al. |
| 9,203,895 | B1* | 12/2015 | Sauer ................. G06F 17/5045 |
| 2014/0365632 | A1* | 12/2014 | Ishii ....................... H04L 43/08 709/223 |
| 2015/0046642 | A1 | 2/2015 | Lee |
| 2015/0356033 | A1 | 12/2015 | Rose |

FOREIGN PATENT DOCUMENTS

WO     2014143056 A1     9/2014

OTHER PUBLICATIONS

LaRue, Jonathan, "Using dual port interconnect to resolve multi-processor system bottlenecks", Jan. 18, 2006. (Year: 2006).*
Siemens et al. "Buffer Device for memory modules (DIMM)", IP.com No. IPCOM000144850D; dated Feb. 10, 2007; 2 pgs.

* cited by examiner

*Primary Examiner* — Edward J Dudek, Jr.
(74) *Attorney, Agent, or Firm* — Cantor Colburn LLP; Bryan Bortnick

(57) ABSTRACT

An Address and Command chip of a distributed memory system includes a memory controller, a first communication link, and one or more interface schedulers, where the one or more interface schedulers include a first interface scheduler residing communicatively between the memory controller and the first communication link. The first interface scheduler is configured to receive a first communication directed from the memory controller to the first communication link; capture the first communication before the first command reaches the first communication link; postpone the first communication for a first set of one or more memory cycles; and reissue the first communication to the first communication link in association with a first cycle offset code indicating how many memory cycles the first command was postponed.

17 Claims, 11 Drawing Sheets

| BEAT | CA0 | CA1 | CA2 | CA3 | CA4 | CA5 | CA6 | CA7 |
|---|---|---|---|---|---|---|---|---|
| 1 | L0 | L1 | A0 | A1 | A2 | A3 | A4 | A5 |
| 2 | A6 | A7 | A8 | A9 | A10 | A11 | A12 | A13 |
| 3 | A14 | A15 | A16 | A17 | A18 | A19 | A20 | A21 |
| 4 | A22 | A23 | A24 | A25 | A26 | A27 | A28 | A29 |
| 5 | A30 | A31 | A32 | A33 | A34 | A35 | A36 | A37 |
| 6 | A38 | C0 | C1 | C2 | C3 | Q0 | Q1 | Q2 |
| 7 | Q3 | Q4 | Q5 | Q6 | ACK | P0 | P1 | P2 |
| 8 | P3 | P4 | P5 | P6 | P7 | P8 | P9 | P10 |

| BCOM ENCODING | | | | | |
|---|---|---|---|---|---|
| MEMORY CYCLE 1 | | | MEMORY CYCLE 2 | | COMMENT |
| BIT 0:1 | BIT 2 | BIT 3 | BIT (0:3) | | |
| 10 | 0/1 | d0 | | | FETCH ON PORT 0/1; d0 IS THE DELAY BIT WHERE DATA ARRIVES 1 CYC LATER (BCOM WAS DELAYED 1 CYCLE) |
| 01 | d0 | d1 | | | WRITE TO BUFFER COMMAND; d0,d1 ARE THE DELAY BITS WHERE DATA ARRIVES 0-3 CYCS LATER |
| 11 | 0/1 | T0 | T1,T2,T3,T4 | | STORE FROM BUFFER PORT 0/1; BUFFER POINTER INDICATED BY T0:T4 |

INTERFACE SCHEDULER FOR A DISTRIBUTED MEMORY SYSTEM

BACKGROUND

The present invention relates to memory systems and, more specifically, to an interface scheduler for a distributed memory system.

A distributed memory system includes a card connected to a host processor, also referred to as a host. The card includes dynamic random-access memory (DRAM) used for data storage by the host, as well as an Address and Command chip (AC), which accepts fetch and store commands over a link from the host and schedules those commands to be executed on the DRAM memory. The card additionally includes a set of Data Chips (DCs), which receive store data from the host over a link between the DCs and the host. The DCs hold the store data in a buffer until the AC schedules the store data to be stored to the DRAM. Likewise, the DCs receive, from the DRAM, fetch data from fetch operations scheduled by the AC, and the DCs send that fetch data over a high-speed serial (HSS) link to the host.

Unlike in a traditional direct attached memory system, where the host decides when each operation is to be executed on the DRAM, in a distributed memory system, the AC controls the order and timing of every DRAM operation. Therefore, the AC must provide the following communications: (1) On a fetch operation, the AC notifies the host of which fetch operation corresponds to arriving data. This notification occurs as a read response command, also referred to as a read response, sent to the host over an HSS link. (2) On a fetch operation, the AC also notifies the DCs of when and on which memory port fetch data will arrive. This notification is sent over a broadcast bus, referred to as data buffer control/communication (BCOM), from the AC to the DCs. (3) On a store operation, the AC notifies the DCs via the BCOM that data is arriving from the host, for which operation that data is arriving, and where to hold that data in its store buffers. At an undetermined time later, the AC actually schedules that store operation for execution on the DRAMs. The AC then notifies the DCs of what data to send to the DRAMs from the store buffers via the BCOM, and the AC informs the host via the HSS link that the store has completed via the HSS link.

Certain of these AC communications are sent a specific number of memory cycles before the data for the respective operations is set to arrive. For instance, a fixed number of cycles occurs between an AC command sent to a DC over the BCOM and the data arriving to the DC from the host for a store operation, and another fixed number of cycles occurs between an AC command sent to the host notifying the host that data is arriving for a fetch operation and the data arriving from the DCs for that fetch operation.

SUMMARY

Embodiments of the present invention are directed to a computer-implemented method for scheduling communications in a distributed memory system. A non-limiting example of the computer-implemented method includes receiving, by a first interface scheduler in communication with a memory controller, a first communication directed from the memory controller to a target component. The first communication is captured before the first communication reaches the target component. The first communication is postponed for a first set of one or more memory cycles. The first communication is reissued to the target component in association with a first cycle offset code indicating how many memory cycles the first communication was postponed.

Embodiments of the present invention are directed to an Address and Command chip (AC) configured to schedule communications in a distributed memory system. A non-limiting example of the AC includes a memory controller, a first communication link, and one or more interface schedulers, where the one or more interface schedulers include a first interface scheduler residing communicatively between the memory controller and the first communication link. The first interface scheduler is configured to receive a first communication directed from the memory controller to the first communication link; capture the first communication before the first command reaches the first communication link; postpone the first communication for a first set of one or more memory cycles; and reissue the first communication to the first communication link in association with a first cycle offset code indicating how many memory cycles the first command was postponed.

Embodiments of the present invention are directed to a distributed memory system configured to schedule communications. A non-limiting example of the distributed memory system includes a dynamic random-access memory (DRAM), at least one data chip in communication with the DRAM, and an AC in communication with the DRAM, the at least one data chip, and a host processor. The AC includes a memory controller, a first communication link, and one or more interface schedulers, where the one or more interface schedulers include a first interface scheduler residing communicatively between the memory controller and the first communication link. The first interface scheduler is configured to receive a first communication directed from the memory controller to the first communication link; capture the first communication before the first command reaches the first communication link; postpone the first communication for a first set of one or more memory cycles; and reissue the first communication to the first communication link in association with a first cycle offset code indicating how many memory cycles the first command was postponed.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a block diagram of a command-and-address frame sent by the host to the AC of the distributed memory system, according to some embodiments of the invention;

FIG. 5 is a block diagram of a BCOM command cycle sent by the AC to the DCs of the distributed memory system, according to some embodiments of the invention;

FIGS. 9A-9B illustrate a typical set of commands used to implement write instructions in a distributed memory system;

FIG. 9C illustrates a set of commands used to implement write instructions, according to some embodiments of the invention;

Figure 1:
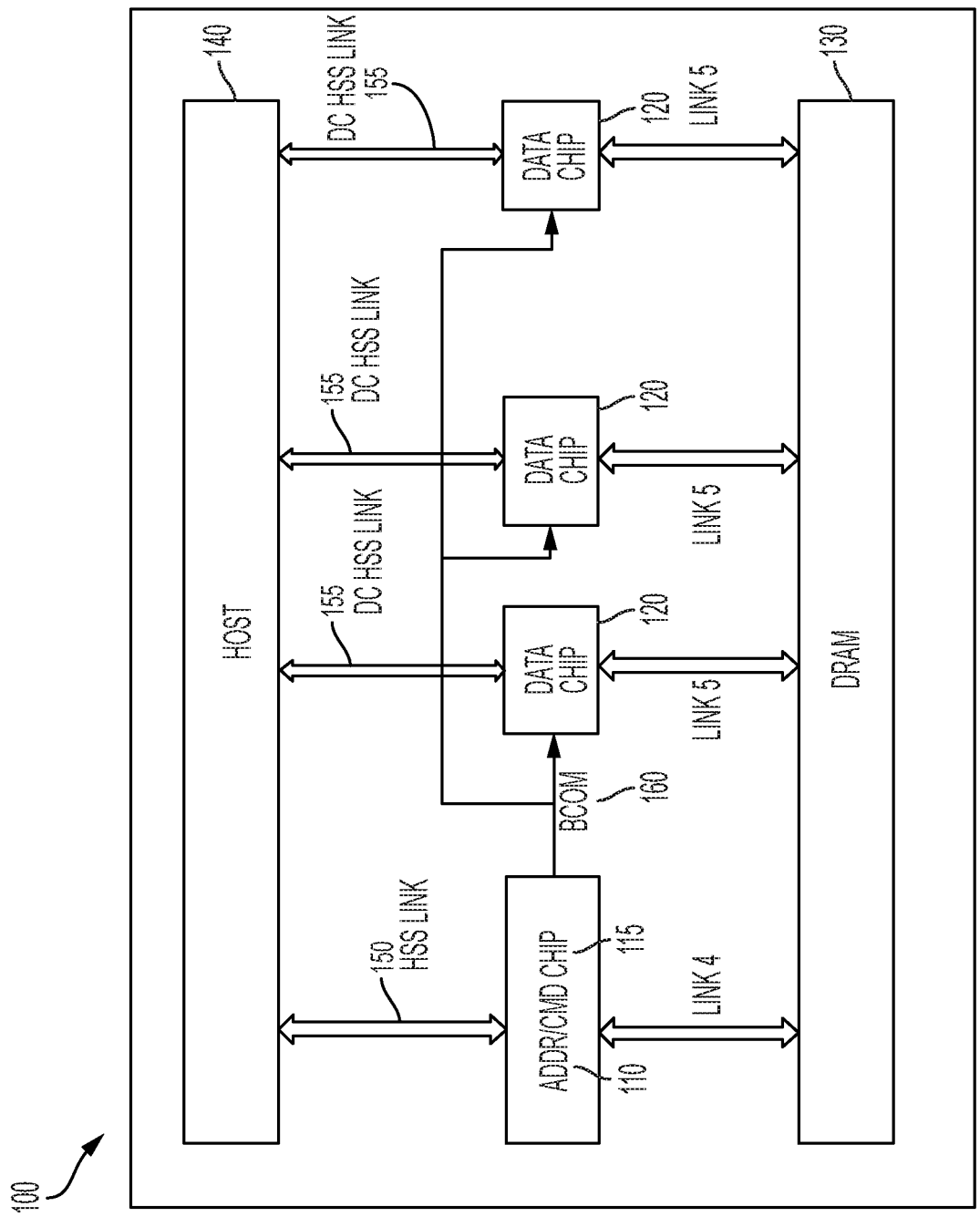
FIG. 1 is a block diagram of a distributed memory system, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±11% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, each command from the AC is associated with a fixed cycle count, creating a fixed delay, between the command being issued from the AC and the arrival of relevant data. For instance, in the case of a read response, the AC sends the read response to the host, and after a fixed number of cycles, the read data arrives on the HSS link. The fixed delays can vary from one command to another, but each component involved (e.g., the AC, the host, the DCs) is aware of the length of each fixed delay and expects those fixed delays. The inflexibility of these fixed delays results in performance loss for cases when data could be sent over a communication link, but, because the communication link was busy processing other operations at the specific time that the communication link would have been needed to ensure the fixed delay lined up as needed, the command had to be delayed. Although it is possible to modify a memory controller to optimally schedule commands in a way that avoids collisions, and although it is alternatively possible to address this issue by adding more pins to the AC, the DCs, and the host, such modifications would lead to increased hardware complexity. The memory controller is thus limited to scheduling read responses, fetch commands, and other commands such that the timing of these commands lines up properly to indicate when expected data is arriving.

Turning now to an overview of the aspects of the invention, one or more embodiments of the invention address the above-described shortcomings of the prior art by providing one or more interface schedulers that postpone commands, such as read responses, fetch commands, write-to-buffer commands, and store-from-buffer commands, so as to insert them into later frames to enable more robust scheduling options. When inserting into a frame a command that was postponed, the interface scheduler may include in the frame a cycle offset code, which indicates how long the command was postponed. Thus, based on the cycle offset code, the target device (e.g., the host or the DC) can determine when the command would have typically arrived and, based on the typical arrival time, can determine when data is expected according to the known fixed delay.

The above-described aspects of the invention address the shortcomings of the prior art by providing more robust scheduling options in a distributed memory system. According to embodiments of the invention, the memory controller 115 need not check the timing of an upstream frame before performing scheduling. Further, without increased complexity of the memory controller 115, the memory controller 115 is able to optimize scheduling and thereby provide better performance for memory accesses.

Turning now to a more detailed description of aspects of the present invention, FIG. 1 is a block diagram of a distributed memory system 100 of a computer system, according to some embodiments of the invention. As shown in FIG. 1, the distributed memory system 100 includes an AC 110 and a set of DCs 120. For example, a double data rate fourth-generation (DDR4) distributed module (DDIMM) might have one AC 110 and nine or ten DCs 120, but it will be understood that the number of DCs 120 may vary. A memory controller 115, which maintains the logic for accessing data on the DRAM 130, resides on the AC 110.

When a host processor, or host 140, of the computer system desires to read from the DRAM 130, various operations occur to implement a read instruction: The host 140 issues a read request via an HSS link 150 to the AC 110 through the use of a downstream frame. The memory controller 115 schedules a read command and issues the read command to the DRAM 130. The memory controller 115 sends a fetch command over a BCOM link 160 to at least one DC 120 to fetch read data (i.e., data to be read). Upon receiving the fetch command, the DC 120 expects the read data to arrive from the DRAM 130 after a fixed delay. The AC 110 sends a read response (i.e., instructing the host that read data is on the way) to the host 140 on an upstream frame via the HSS link 150. Upon receiving the read response, the host 140 expects the read data to arrive on the HSS link 150 from the DC 120 after a fixed delay. This fixed delay is known to the host 140 and is typically determined by the architecture.

When the host 140 desires to write to the DRAM 130, various operations occur to implement a write instruction: The host 140 issues a write request via HSS link 150 to the AC 110 through a downstream frame. The AC 110 the sends a write-to-buffer command to at least one DC 120 via the BCOM link 160, where the write-to-buffer command instructs the DC 120 to write specific data to a local buffer on the DC 120 in anticipation of copying that specific data to the DRAM 130. Upon receiving the write-to-buffer command, the DC 120 expects write data (i.e., data to be written) to arrive on a DC HSS link 155 from the host 140 after a fixed delay. The DC HSS link 155 is a high-speed serial link between one or more DCs 150 and the host 140. When the write data is received by the DC 120, the DC 120 writes the write data to the local buffer. At a later time, the memory controller 115 schedules a write command and issues the write command to the DRAM 130. The memory controller 115 sends a store-from-buffer command to the DC 120. Upon receiving the store-from-buffer command, the DC 120 extracts stored data from its local buffer and sends the stored data to the DRAM 130 after a known fixed delay.

A frame is a fixed block of data transmitted as a unit. An upstream frame is a frame sent toward to the host 140, rather than away from the host 140, while a downstream frame is a frame sent toward the DRAM 130. A frame may include one or more memory cycles, also referred to as cycles. For example, and not by way of limitation, a frame may include four memory cycles. Although, throughout this disclosure, frames are referred to as having four memory cycles, it will be understood that the number of memory cycles may vary from one embodiment to another.

In existing systems, given the fixed delays, the host 140 calculates the arrival of read data based on when the host 140 receives the read response. Analogously, the DCs 120 calculate when read data will arrive to them based on when they receive the fetch command. If the memory controller 115 would like to schedule the read due to the timing constraints, such that the read data arrives one memory cycle later than it would otherwise, and such that the fixed delay from scheduling this read to the next frame cannot be achieved, then, in existing systems, the memory controller 115 would have to delay scheduling the read until the next point where fixed delay between scheduling the read and the next available response frame can be established. However, embodiments of the invention address this issue through the addition of one or more interface schedules in the AC 110.

Figure 2:
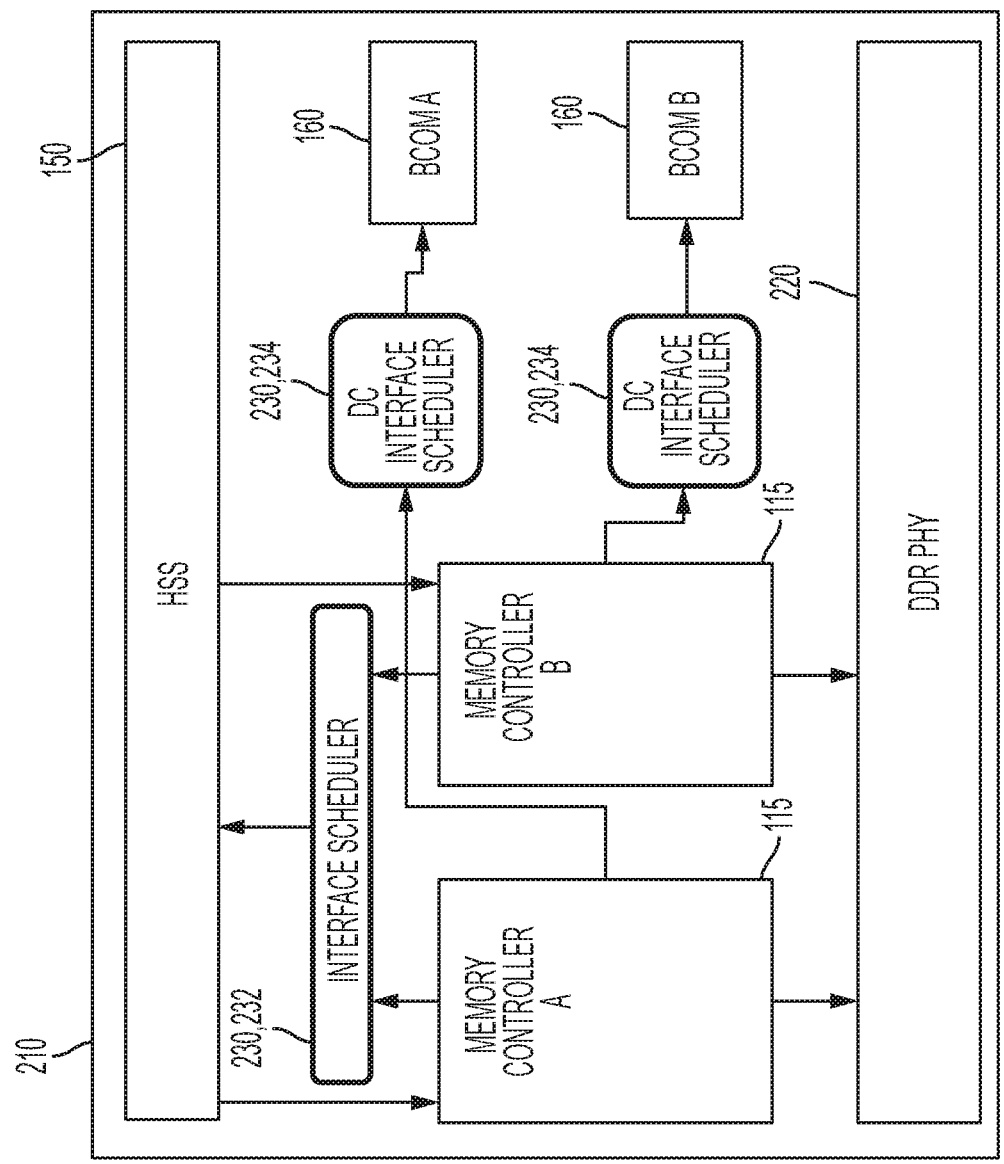
FIG. 2 is a block diagram of an Address and Command chip, according to some embodiments of the invention.

FIG. 2 is a block diagram of the AC 110 of the distributed memory system 100, according to some embodiments of the invention. In some embodiments of the invention, the AC 110 may include two ports, which may enable tasks to be scheduled concurrently in some cases. In this case, as shown in FIG. 2, the AC 110 may include a second memory controller 115 along with a respective second BCOM link 160 to communicate with the at least one DC 120. Further, in this case, the two memory controllers 115 may behave as a dual-port memory controller 115 and may be referred to herein as such.

The AC 110 may include one or more interface schedulers 230. These may include one or more host interface schedulers 232, one or more DC interface schedulers 234, or a combination of both. A host interface scheduler 230 may sit between the memory controller 115 and the HSS link 150 and may capture and reschedule commands from the memory controller 115 to the host 140, while a DC interface scheduler 230 may sit between the memory controller 115 and the BCOM link 160 and may capture and reschedule commands from the memory controller 115 to the DCs 120. More generally, in some embodiments of the invention, an interface scheduler 230 resides communicatively between the memory controller 115 and a target component, so as to manage commands en route to the target component. In some embodiments of the invention, each interface scheduler is a specialized hardware device, but alternatively, each interface scheduler 230 may be a software module running on the AC 110 or may include a combination of hardware and software.

Generally, the AC 110 transmits various communications, including responses to the host 140 and commands to the DCs 120. The one or more interface schedulers 230 may postpone some or all of the various communications by capturing them and reissuing them at later cycles. When an interface scheduler 230 sends a communication, the interface scheduler 230 may include a cycle offset code in the same frame as the communication, indicating how long the communication was postponed. As such, the target (i.e., the host 140 or a DC 120) of the communication may determine when to look for additional data that would follow the original communication time by a fixed delay.

In a first example, the memory controller 115 transmits a read response to the host 140 in an upstream frame. The memory controller 115 need not send the read response with any regard to timing within the upstream frame, thus enabling the memory controller 115 to optimize its scheduling of this communication among others being issued. Thus, for instance, the read response may be sent by the memory controller 115 in the second cycle of the upstream frame, which is not the cycle where the host 140 is expecting the memory controller 115 to send the read response. However, an interface scheduler 230 may capture the read response and send it at a later time, along with a cycle offset code that indicates when the read response was originally sent. As such, for example, although the memory controller 115 might send the read response in second cycle, or another cycle, the interface scheduler 230 ensures that when the read response arrives to the host 140, the expected data arrival cycle can be determined.

An interface scheduler 230 between the memory controller 115 and the host 140 may capture that read response, such that the read response does not proceed directly to the host 140. The interface scheduler 230 may start a clock that keeps track of the number of cycles that pass until the interface scheduler 230 inserts the read response into another upstream frame. Specifically, for instance, the interface scheduler 230 may seek to insert the read response into a cycle of an upstream frame where the host 140 will expect the memory controller 115 to send the read response. The cycle of the frame into which the read response is inserted may vary from embodiment to embodiment, but may be fixed within a single embodiment, thus enabling the interface scheduler 230 to know where to insert the read response within a given frame. The clock may increment by 1 after each memory cycles passes without the read response having been incorporated into an upstream frame. More specifically, if the host 140 expects the memory controller 115 to send the read responses in the fourth cycle of upstream frames, then the interface scheduler 230 may postpone the read response until the interface scheduler 230 can insert the read response into the fourth cycle of an upstream frame.

The value of the cycle offset code provided by the interface scheduler 230 may be based on the clock. If the interface scheduler 230 does not postpone the read response, then the cycle offset code may have a value of 0. More generally, the cycle offset code may have a value equal to the number of memory cycles the interface scheduler 230 has postponed the read response.

Analogously, an interface scheduler 230 may capture a command directed to the DC 120 and thus headed to the BCOM link 160 as part of a BCOM cycle. In that case, when the interface scheduler 230 schedules the command, by inserting the command into a second BCOM cycle, the interface scheduler 230 may also incorporate the applicable cycle offset code into the second BCOM cycle to indicate how long the interface scheduler 230 postponed the command.

Figure 3:
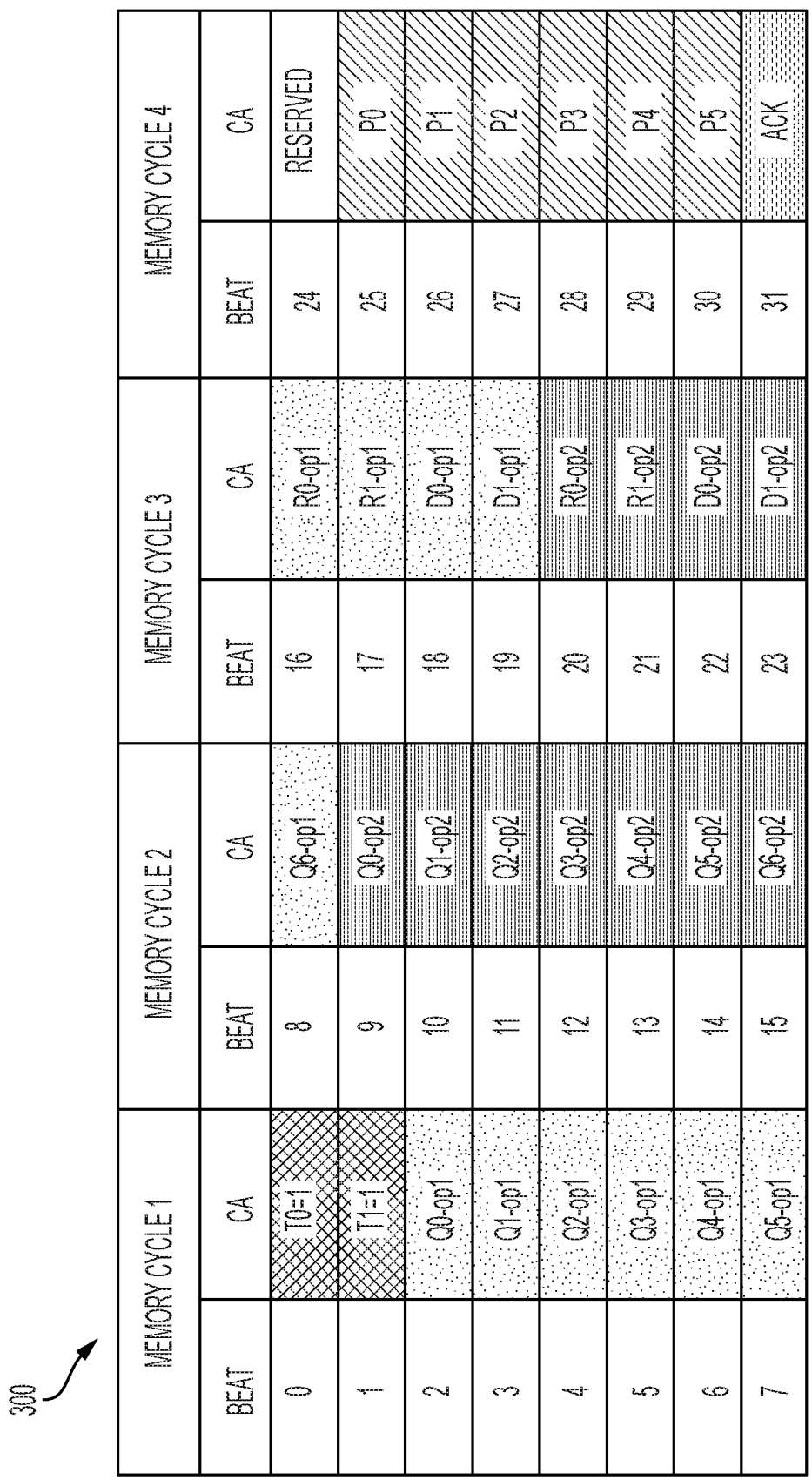
FIG. 3 is a block diagram of a response frame sent by the AC to a host of the distributed memory system, according to some embodiments of the invention.

FIG. 3 is an example upstream frame 300 transmitted from the AC 110 to the host 140, according to some embodiments of the invention. It will be understood that this example does not limit the variations possible within the upstream frame 300. The following text explains the notations in FIG. 3:

BEAT: This is the cycle number in the HSS link 150. Because, in some embodiments of the invention, an HSS link clock speed is eight times faster than the memory clock, there are eight bits of data per HSS lane for every memory cycle in this example.

CA: This specifies the lane of the HSS link 150, where only one lane is shown in this example.

T0-T1: Frame type, or frame identifier, which specifies the format or purpose of the frame. This determines how the remaining bits of the frame are used.

R0-R1: This specifies the response type (e.g., read response, write done, attention response).

Q0-Q6: These seven bits together represent a command tag, which matches a command tag previously received from the host 140.

D0-D1: This is the cycle offset code.

ACK: This single bit acknowledgement indicates that a prior downstream frame was successfully received by the AC 110, with no cyclic redundancy check (CRC) error.

P0-P5: These six bits are used together as a CRC code.

FIG. 4 is an example downstream frame 400 transmitted from the host 140 to the AC 110, according to some embodiments of the invention. It will be understood that this example does not limit the variations possible within the downstream frame 400. The following text explains the notations in FIG. 4:

BEAT: This refers to the HSS link cycle number.

CA0-CA7: This is the lane number in the HSS link 150. In this example, there are eight lanes, with each lane providing eight bits of data per memory cycle.

L0-L1: Frame type, or frame identifier, which specifies the format or purpose of the frame. This determines how the remaining bits of the frame are used.

A0-A38: These bits specify an address.

C0-C3: These bits specify a command type (e.g., read, write)

Q0-Q6: These bits specify a command tag.

ACK: This single bit indicates that a prior upstream frame has been successfully received by the host 140 from the AC 110, with no CRC errors.

p0-p10: These bits together represent a CRC code.

FIG. 5 is an example BCOM cycle 500 transmitted from the AC 110 to the DCs 120, according to some embodiments of the invention. It will be understood that this example does not limit the variations possible within the BCOM cycle 500. In this example, the BCOM link 160 is four bits wide. Also in this example, a store-from-buffer command uses two memory cycles on the BCOM link 160. Thus, in this example, a store-from-buffer command cannot be delayed because there is no location for including a cycle offset code. If a collision occurs, a fetch or write-to-buffer command may need to be delayed and a corresponding delay value may be set. The following table explains the notations in FIG. 5:

bit0-1: This specifies a command type, where "10" denotes a fetch command, "01" denotes a write-to-buffer command, and "11" denotes a store-from-buffer command in this example.

bit2: This indicates port number for fetch for store-from-buffer command.

D0-D1: This indicates a delay value or cycle offset code.

T0-T4: This is a buffer pointer for a store-from-buffer command.

Figure 6:
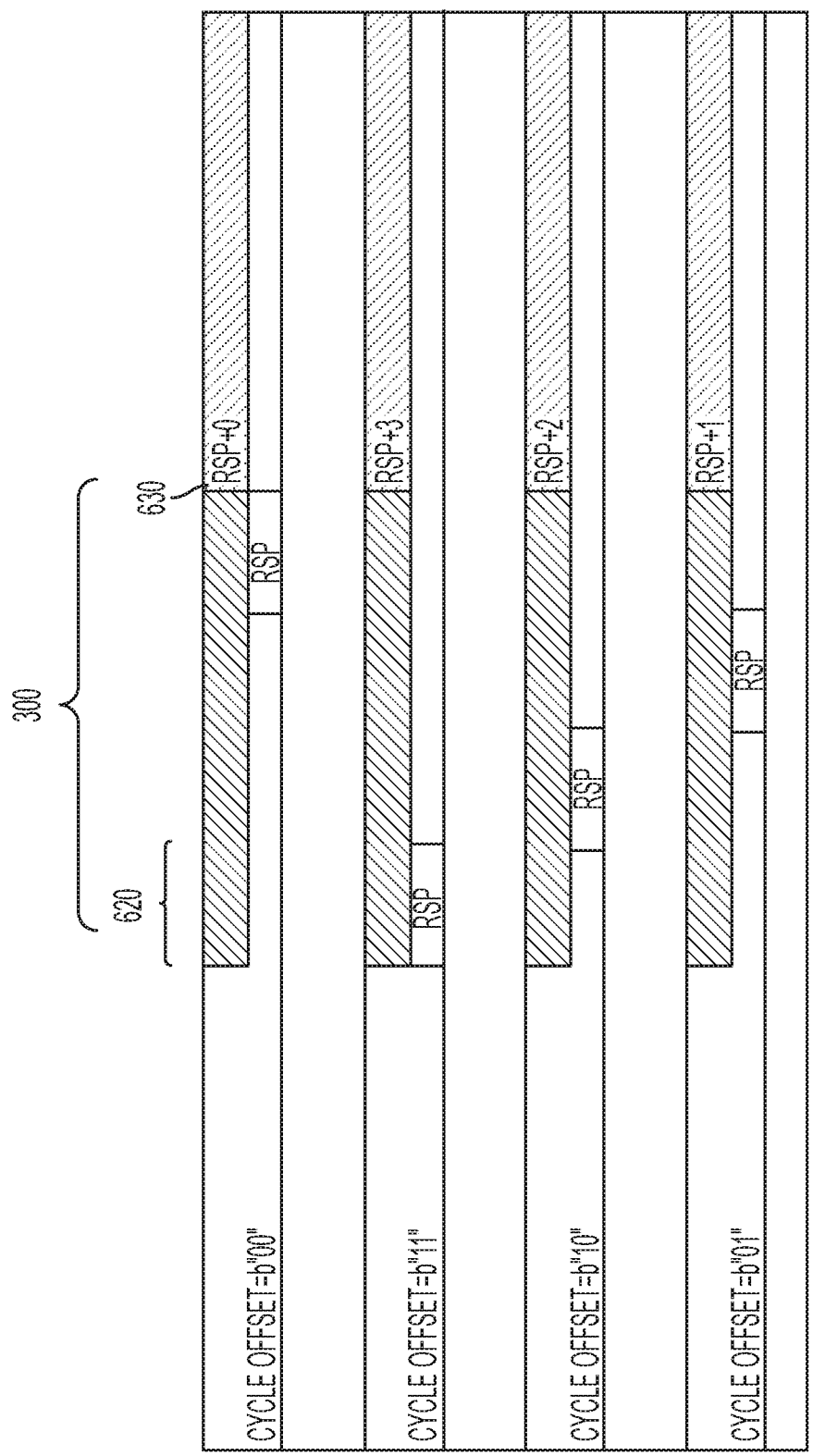
FIG. 6 is a diagram illustrating example timings of read responses for a single-port memory controller of the distributed memory system, according to some embodiments of the invention.

FIG. 6 is a diagram illustrating example timings of read responses for a single-port memory controller 115 of the memory system 100, according to some embodiments of the invention. Specifically, FIG. 6 includes four lines, each of which shows an example in which a read response is received in a first upstream frame 300 and is postponed to a second upstream frame 300. As shown in FIG. 6, in this example, an upstream frame 300 includes four memory cycles 620, and the host 140 expects the memory controller 115 to send responses in the fourth memory cycle 620 of an upstream frame 300. The example of FIG. 6 illustrates that a read response can be sent by the memory controller 115 in each of the four cycles, according to some embodiments of the invention. However, regardless of when the memory controller 115 sends the read response, the interface scheduler 210 may postpone the read response to a position expected by the host 140 (e.g., the fourth cycle 620), and may include the cycle offset code 630. As such, the host 140 finds the read response where the host 140 expects to find the read response, and the host 140 is also able to calculate when the read data will arrive, based on using the cycle offset code 630 to determine when the read response was originally scheduled, as the fixed delay will be based on the original scheduling of the read response by the memory controller 115.

In this example, because the host 140 expects to find the memory controller 115 to send the responses in the fourth memory cycle 620, the reference point to calculate the fixed delay is the fourth cycle 620 of the upstream frame 300. If a response shows up at an interface schedule 230 before the fourth cycle 620, then the interface scheduler 230 postpones the response and uses the cycle offset code 630 to compensate for the delay. The host 140 will then subtract the value of cycle offset code 630 from the cycle 620 at which the response was received, when calculating the fixed delay. It will be understood by one skilled in the art that, in some embodiments, responses may be expected by the host 140 in a different cycle 620, and the cycle offset code 630 would thus be determined based on that expectation instead.

As shown in the top line of FIG. 6, the read response may be sent by the memory controller 115, and received by the interface scheduler 230, in the fourth memory cycle 620 of an upstream frame 300. In that case, the interface scheduler 230 need not capture the read response. Because the interface scheduler 230 has not waited to reissue the read response, the cycle offset code 630 may be set to 0 in this example. This cycle offset code 630 may be included in the upstream frame 300 along with the read response. The position of the cycle offset code 630 within a frame may vary from embodiment to embodiment. However, this position may be fixed within a single embodiment, thus enabling the host 140 and the DCs 120 to know where to locate the cycle offset code 630. For example, and not by way of limitation, although not shown in FIG. 6, the cycle offset code 630 may be sent in the third cycle 620 of the upstream frame 300 into which the read response is reissued. More generally, the cycle offset code 630 need not be sent in the same cycle 620 as the read response although, in some embodiments of the invention, the cycle offset code 630 is included within the same upstream frame 300 as the read response.

As shown in the second line, the read response may be captured from the first cycle 620 of an upstream frame 300, and then reinserted into the next upstream frame 300 three cycles later with a cycle offset code 630 of 3. The read response may be captured from the second cycle 620 of an upstream frame 300, and then reinserted into the next upstream frame 300 two cycles later with a cycle offset code 630 of 2. The read response may be captured from the third cycle 620 of an upstream frame 300, and then reinserted into the next upstream frame 300 one cycle later with a cycle offset code 630 of 1. Each of these potential cycle offset codes 630 can be represented by two bits, and thus the cycle offset code 630 may make up two bits of the upstream frame 300 into which the communication is incorporated. In some embodiments of the invention, the bits required for the cycle offset code 630 may reside in a fixed position within the upstream frame 300, such that the target (e.g., the host 140 or the DC 120) knows where to locate the cycle offset code 630.

Figure 7:
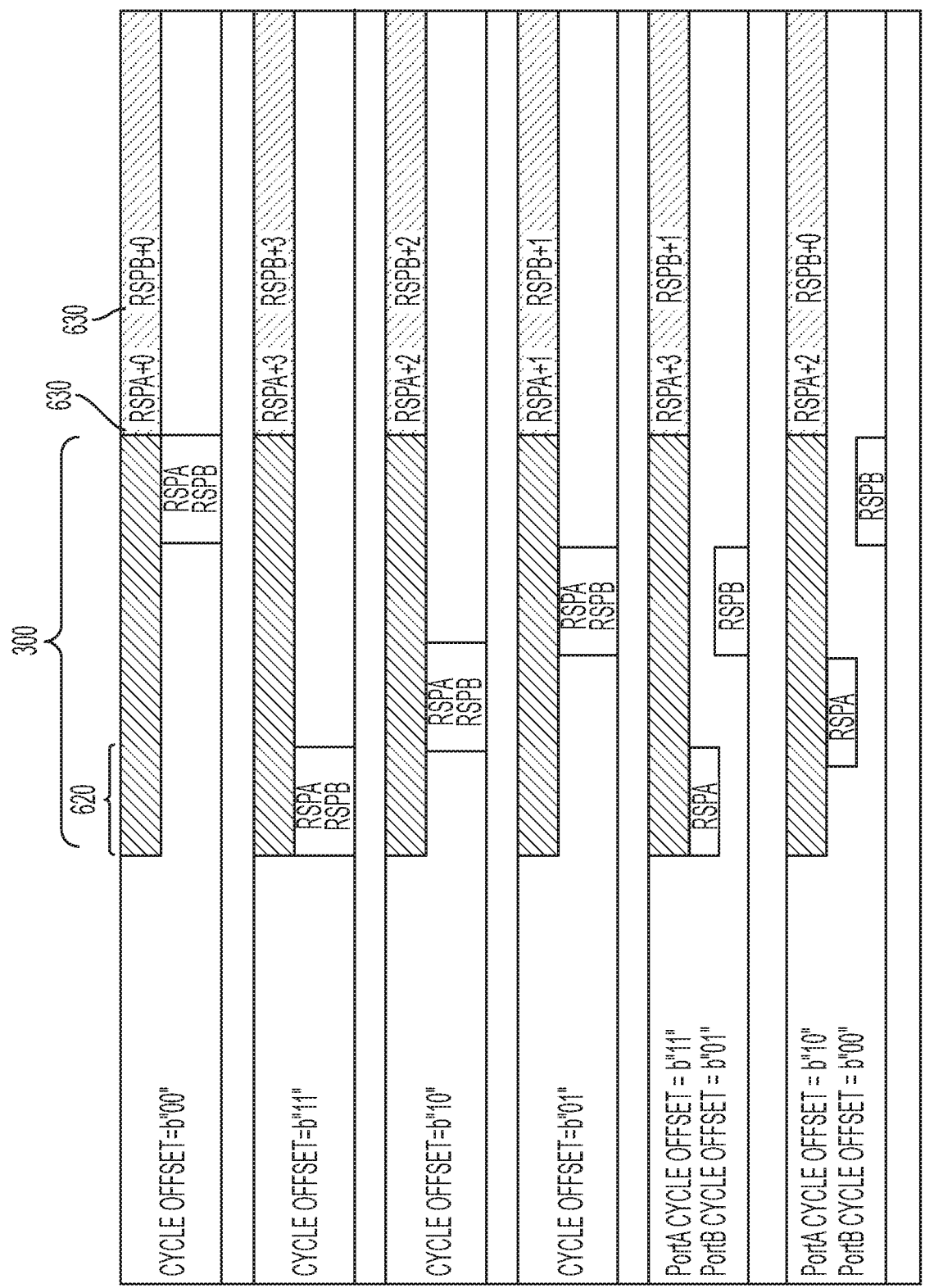
FIG. 7 is a diagram illustrating example timings of read responses for a dual-port memory controller of the distributed memory system, according to some embodiments of the invention.

FIG. 7 is a diagram illustrating example timings of read responses for a dual-port memory controller 115 of the memory system 100, according to some embodiments of the invention. In this example, each port of the memory controller 115 may send its own respective upstream frames 300 to the host 140. Specifically, FIG. 7 shows six examples in which a first read response and a second read response are received at each of four different memory cycles 620 of a first set of upstream frames 300 and are postponed to a second set of upstream frames 300. It will be understood that there are actually sixteen possible combinations of receiving these two read responses at various cycles 620 of the first set of upstream frames 300, and it will be further understood that these six examples are provided for illustrative purposes only and do not represent all possibilities. The examples of FIG. 7 illustrate that read responses can be sent by a dual-port memory controller 115 in each of the four cycles 620 of an upstream frame 300.

As shown in these examples, a respective cycle offset code 630 may be generated and incorporated into an upstream frame 400 for each read response when there are two memory controllers 115, or alternatively, a single cycle offset code 630 may be used if the two cycle offset codes 630 would have the same value.

As shown in the first line of FIG. 7, both read responses may be arrive at the interface schedulers 230 in the respective fourth cycles 620 of upstream frames 300, and both read responses may then be accompanied in the respective upstream frames 300 with a cycle offset code 630 of 0. Analogously, if both read responses are captured from the first cycle 620 of the upstream frames 300, then both read responses may be inserted into the respective next upstream frames 300 with a cycle offset code 630 of 3. If both read responses are captured from the second cycle 620 of the upstream frames 300, then both read responses may be inserted into the respective next upstream frames 300 with a cycle offset code 630 of 2. Lastly, if both read responses are captured from the third cycle 620 of the upstream frames 300, then both read responses may be inserted into the respective next upstream frames 300 with a cycle offset code 630 of 1.

However, if the first read response is captured from the first cycle 620 and the second read response is captured from the third cycle 620, then both read responses may be inserted into the respective next upstream frame 300, but they may each have a respective cycle offset code 630 also included in that next upstream frame 300. A first cycle offset code 630 corresponding to the first read response may have a value of 3, and a second cycle offset code 630 corresponding to the second read response may have a value of 1. As shown in the example of the final line of FIG. 7, if the first read response is captured from the second cycle 620 and the second read response is in the fourth cycle 620, then the first read response may be rescheduled in the respective next upstream frame 300. The first cycle offset code 630 corresponding to the first read response may have a value of 2, and the second cycle offset code 630 corresponding to the second read response may have a value of 0. Thus, some embodiments of the invention may support a dual-port design, thus enabling independent scheduling with robust scheduling options for each port.

One of skill in the art will understand how the examples of FIG. 6 and FIG. 7 extend to other types of responses as well as to commands sent to the BCOM link 160 in a BCOM cycle 500 rather than to the HSS link 150 in an upstream frame 300.

Figure 8A:
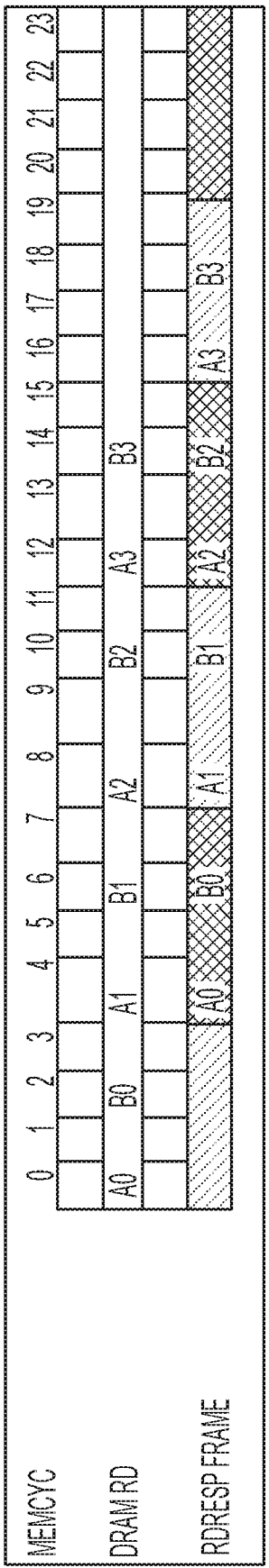
FIGS. 8A-8B illustrates a typical set of commands within upstream frames from the Address and Command chip to the host, in a distributed memory system.
Figure 8B:
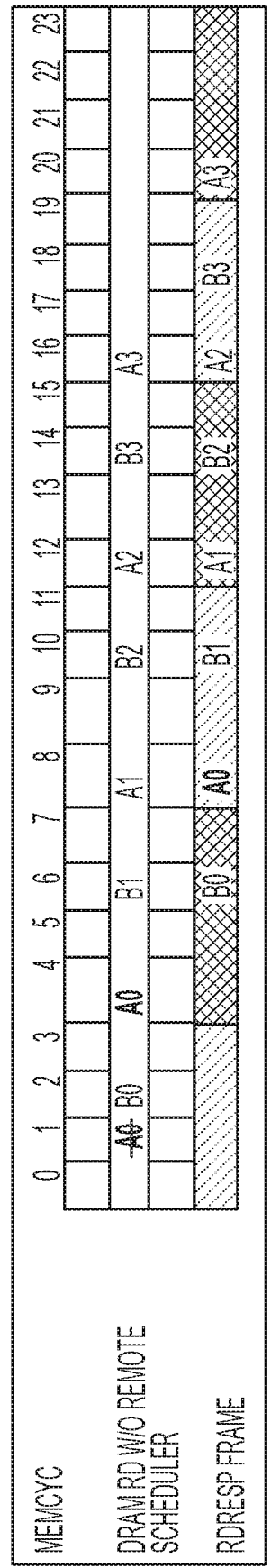

FIGS. 8A-8B illustrate a typical set of communications within upstream frames from the AC 110 to the host 140, without the use of an interface scheduler 230. Specifically, FIG. 8A illustrates a typical series of read responses in a series of upstream frames 300 from a dual-port memory controller 115, without use of an interface scheduler 230, while FIG. 8B illustrates a typical series of read responses where the dual-port memory controller 115 attempts to schedule one of the read responses differently than in FIG. 8A.

In the example of FIG. 8A, the two ports of the memory controller 115 are referred to as Port A and Port B. Port A issues read responses every four cycles on cycles 0, 4, 8, 12, etc., while Port B issues read responses every four cycles on cycles 2, 6, 10, 14, etc. In this example, which takes the form of a table in FIG. 8A, the top row indicates the ongoing memory cycles 620, each with a respective number. The second row indicates when various read commands are issued to the DRAM 130, where the read commands from Port A are represented by A0, A1, A2, and A3, and the read commands from Port B are represented by B0, B1, B2, and B3. For each of these read commands, a corresponding fetch command is sent to the DC 120, and the DC expects read data to arrive after a fixed delay. The third row of the table indicates when the corresponding read responses are sent to the host 140. Upon receiving each read response, the host 140 expects the read data to become valid on the HSS link 150 (i.e., to arrive via the HSS link) after another fixed delay. In order to ensure that the timing works out properly, the memory controller 115 send read responses to the host 140 according to the timing indicated in the third row of the table in FIG. 8A.

The example of FIG. 8B is based on the example of FIG. 8A except, in this case, Port A of the memory controller 115 is unable or chooses not to (e.g., for optimization purposes) send the read command A0 to the DRAM 130 in Cycle 0 as done in the example of FIG. 8A. Without an interface scheduler 230, the memory controller 115 is unable to send the A0 read command in Cycle 1, as doing so would interrupt the timing of other operations involved in the read instruction. Instead, Port A waits until Cycle 4 to issue the read command to the DRAM 130. This shifts the other read-related commands that need to be issued and adds latency to each of the read commands A0, A1, A2, and A3 as well as the corresponding read responses.

Figure 8C:
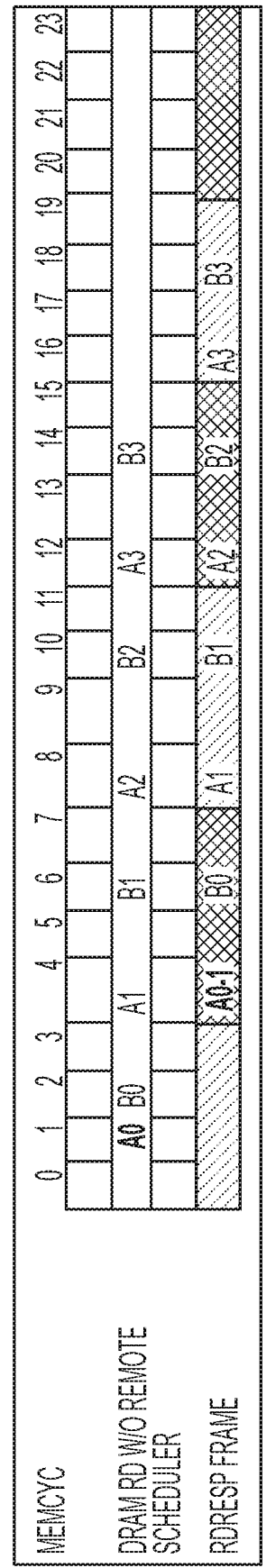
FIG. 8C illustrates a set of commands within upstream frames from the Address and Command chip to the host, according to some embodiments of the invention.

FIG. 8C illustrates a set of communications within upstream frames from the AC 110 to the host 140, according to some embodiments of the invention. Like FIG. 8A and FIG. 8B, FIG. 8C is a table showing a respective row for each of memory cycles 620, read commands to the DRAM 130, and read responses. In the case of FIG. 8C, however, at least one interface scheduler 230 are used, according to some embodiments of the invention. In this example, Port A of the memory controller 115 is once again unable or chooses not to send the read command for A0 to the DRAM 130 in Cycle 0. However, due to the interface scheduler 230, the memory controller 115 may send the read command for A0 to the DRAM 130 in Cycle 1. In this case, the interface scheduler 230 knows that the read response would need to be sent in Cycle 5 to maintain the appropriate timing. However, instead, the interface scheduler 230 may issue the read response to the host 140 one cycle early, at Cycle 4, along with an offset frame indicating that the read response is arriving one cycle 620 early. As such, the host 140 may know to adjust the usual fixed delay by one cycle when decoding the response frame.

Figures 9A, 9B, 9C:
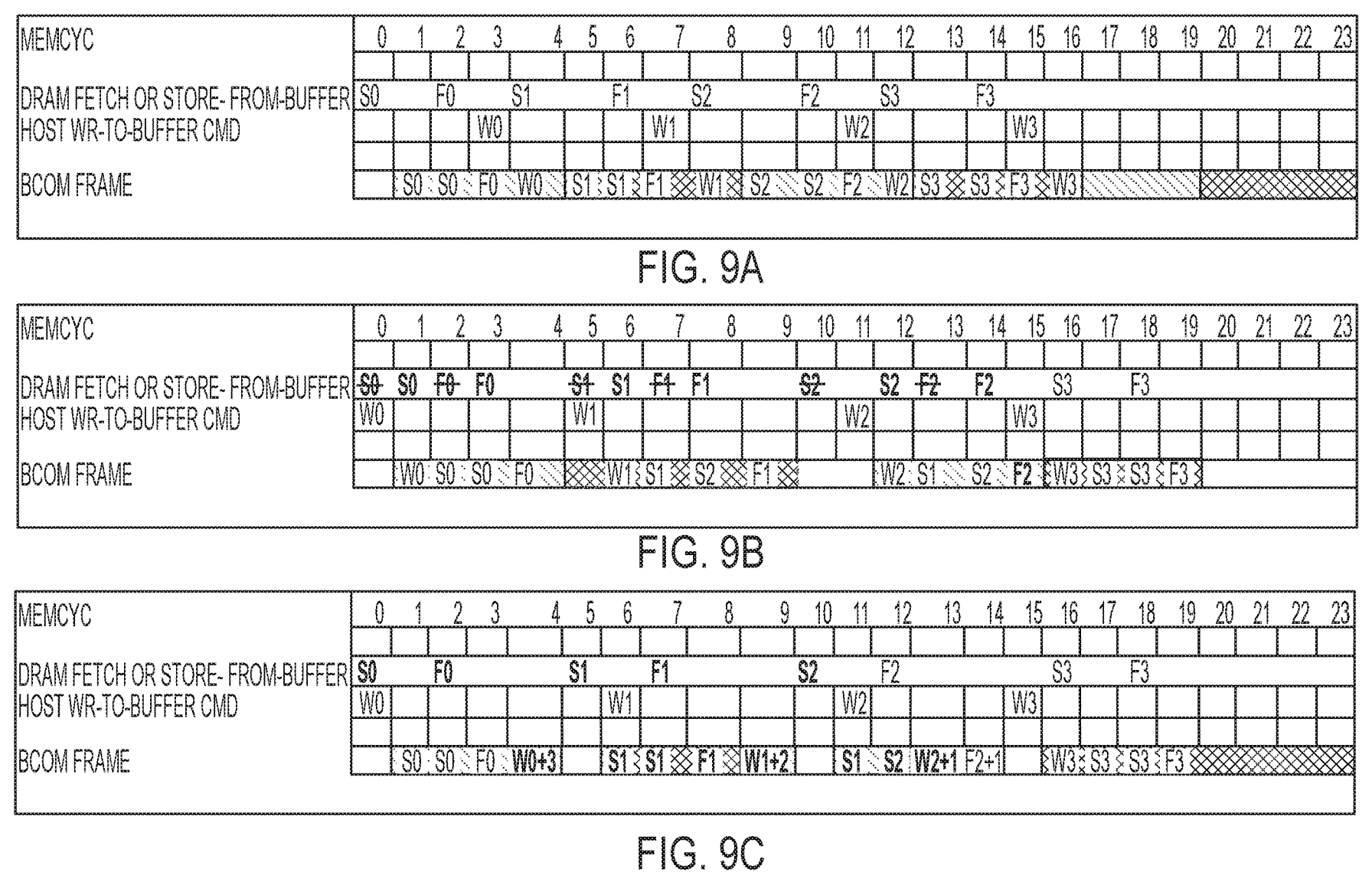

FIGS. 9A-9B illustrate a typical set of commands used in the AC's communications to the DC 120. Specifically, FIG. 9A is a table with three rows, illustrating a typical series of four write and four read instructions, each of which includes a respective fetch command (F0, F1, F2, or F3), a respective store-from-buffer command (S0, S1, S2, or S3), and a respective write-to-buffer command (W0, W1, W2, or W3). The top row represents the ongoing memory cycles 620. The second row is a split row representing when the AC 110 notifies the DC 120 of incoming read data from the DRAM 130 by sending a BCOM fetch command, when the AC 110 notifies the DC 120 to send the data out to the DRAM 130 by sending BCOM store-from-buffer command, and when the AC 110 notifies DC 120 of incoming write data from the host 140 by sending a BCOM write-to-buffer command. The third row represents responses in the BCOM cycle 500. Specifically, in BCOM cycles 500, the DC 120 is issued the various commands shown. As shown in FIG. 9A, in this example, a fetch command and a write-to-buffer command each take one cycle 620 of a BCOM cycle 500, and a store-to-buffer command takes two cycles 620 of a BCOM cycle 500. These factors are taken into consideration when scheduling these commands. As shown in FIG. 9A, in this example, the memory controller 115 is able to schedule each of these commands without collisions.

The example of FIG. 9B is based on the example of FIG. 9A except, in this case, the memory controller 115 chooses to notify the DC 120 of the write data W0 arriving from the host 140 in Cycle 0. As shown in FIG. 9B, other instructions have to be rearranged to enable the BCOM cycle 500 to accurately reflect the timing of data to be fetched, stored, and written while also avoiding command collisions in the BCOM cycle 500.

FIG. 9C illustrates a set of commands used to implement write instructions, according to some embodiments of the invention. Specifically, FIG. 9C illustrates the improved result of using at least one interface scheduler 230 when the memory controller 115 notifies the DC 120 of the write data in Cycle 0. As shown in FIG. 9C, the one or more interface schedulers 230 may provide an alternative means of avoiding collisions, specifically by postponing BCOM cycle commands to the DCs 120 as needed and including an applicable offset code with each postponement. Each command in the BCOM cycle 500 shown with a +1, +2, or +3 indicates that the BCOM cycle 500 includes a cycle offset code 630 of 1, 2, or 3, respectively.

Figure 10:
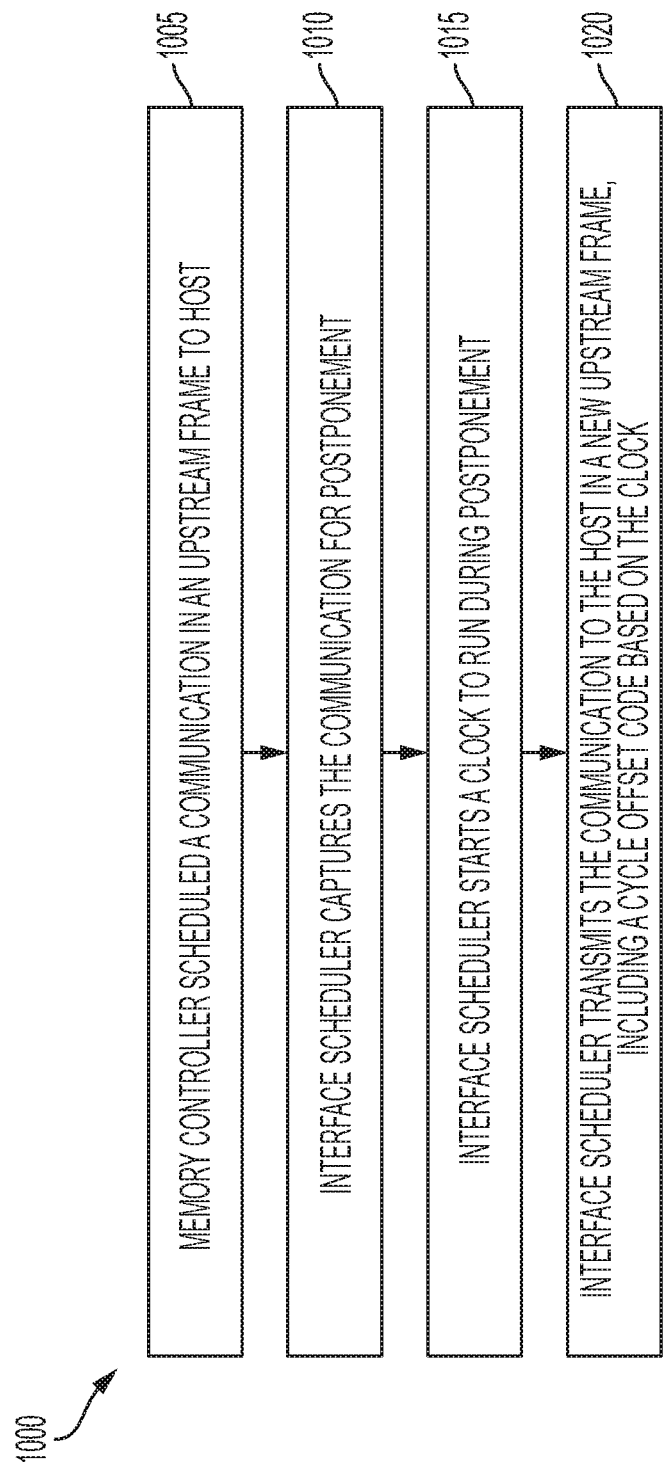
FIG. 10 is a flow diagram of a method of utilizing cycle offset codes, according to some embodiments of the invention.

FIG. 10 is a flow diagram of a method 1000 of utilizing cycle offset codes 630, according to some embodiments of the invention. Specifically, FIG. 10 describes the use of a cycle offset code 630 in a communication between the memory controller 115 and the host 140. It will be understood, however, that an analogous method applies to communications between the memory controller 115 and one or more of the DCs 120. As shown in FIG. 10, at block 1005, the memory controller 115 may schedule a communication in an upstream frame 300 to the host 140 without regard to timing expectations of the host 140 or timing expectations of the DC 120, which is also involved in the instruction (e.g., read, write) to which the communication is related. At block 1010, an interface scheduler 230 may capture the communication for postponement. In some embodiments of the invention, when capturing the communication, the interface scheduler 230 may wipe the communication from the upstream frame 300 while leaving the remainder of the upstream frame 300 intact for the host 140. Alternatively, however, the entire upstream frame 300 in which the communication was issued may be wiped, if other data in the upstream frame 300 is not needed by the host 140. At block 1015, the interface scheduler 230 may start a clock running to count the number of cycles skipped without transmitting the communication to the host 140. At block 1020, at a selected position in a new upstream frame 300 (e.g., in the first cycle 620 of the new upstream frame 300), the interface scheduler 230 may transmit the communication to the host 140, along with a cycle offset code 630 with a value indicating the number of cycles skipped in postponing the communication. The number of cycles skipped may be determined based on the clock. As such, the host 140 will know when to look for data on the HSS link 150.

The above method 1000 describes the use of a cycle offset code 630 in an upstream frame 300 from the memory controller 115 to the host 140. It will be understood, however, that an analogous method applies for utilizing a cycle offset code 630 in a BCOM cycle 500 between the memory controller 115 and the DC 120.

Figure 11:
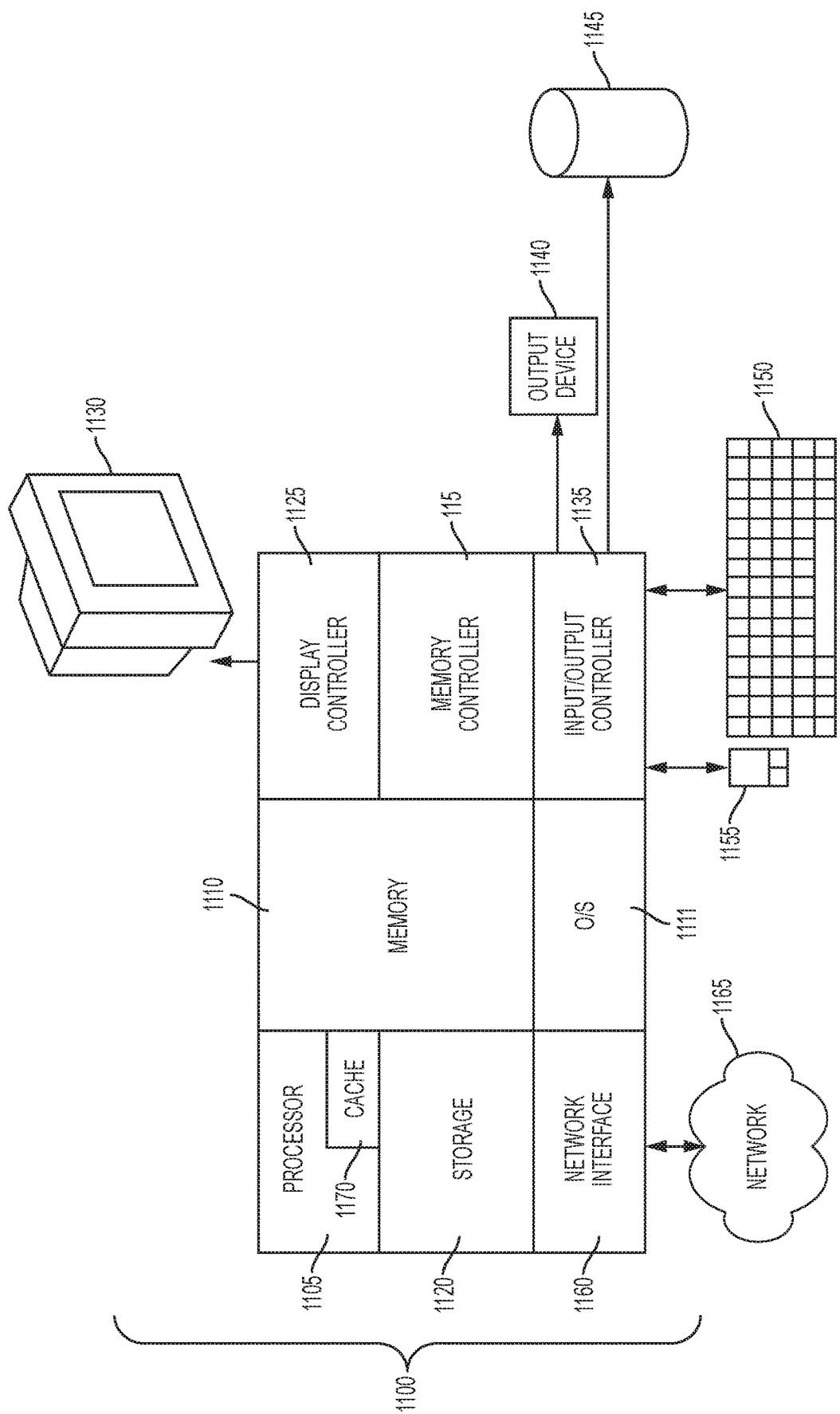
FIG. 11 is a block diagram of a computer system for implementing some or all aspects of the memory system, according to some embodiments of this invention.

FIG. 11 is a block diagram of a computer system 1100 for implementing some or all aspects of the memory system 100, according to some embodiments of this invention. The memory systems 200 and methods described herein may be implemented in hardware, software (e.g., firmware), or a combination thereof. In some embodiments, the methods described may be implemented, at least in part, in hardware and may be part of the microprocessor of a special or general-purpose computer system 1100, such as a personal computer, workstation, minicomputer, or mainframe computer.

In some embodiments, as shown in FIG. 11, the computer system 1100 includes a processor 1105, memory 1110 coupled to a memory controller 115, and one or more input devices 1145 and/or output devices 1140, such as peripherals, that are communicatively coupled via a local I/O controller 1135. In some embodiments of the invention, the memory 1110 includes one or more DRAMs 130, and the memory controller 115 resides on the AC 110 along with one or more interface schedulers 230, as discussed in detail above. These devices 1140 and 1145 may include, for example, a printer, a scanner, a microphone, and the like. Input devices such as a conventional keyboard 1150 and mouse 1155 may be coupled to the I/O controller 1135. The I/O controller 1135 may be, for example, one or more buses or other wired or wireless connections, as are known in the art. The I/O controller 1135 may have additional elements, which are omitted for simplicity, such as controllers, buffers (caches), drivers, repeaters, and receivers, to enable communications.

The I/O devices 1140, 1145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1105 is a hardware device for executing hardware instructions or software, particularly those stored in memory 1110. The processor 1105 may be a custom made or commercially available processor, a central processing unit (CPU), an auxiliary processor among several processors associated with the computer system 1100, a semiconductor-based microprocessor (in the form of a microchip or chip set), a macroprocessor, or other device for executing instructions. The processor 1105 includes a cache 1170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1170 may be organized as a hierarchy of more cache levels (L1, L2, etc.).

The memory 1110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1110 may incorporate electronic, magnetic, optical, or other types of storage media. Note that the memory 1110 may have a distributed architecture, where various components are situated remote from one another but may be accessed by the processor 1105.

The instructions in memory 1110 may include one or more separate programs, each of which comprises an ordered listing of executable instructions for implementing logical functions. In the example of FIG. 11, the instructions in the memory 1110 include a suitable operating system (OS) 1111. The operating system 1111 essentially may control the execution of other computer programs and provides scheduling, input-output control, file and data management, memory management, and communication control and related services.

Additional data, including, for example, instructions for the processor 1105 or other retrievable information, may be stored in storage 1120, which may be a storage device such as a hard disk drive or solid-state drive. The stored instructions in memory 1110 or in storage 1120 may include those enabling the processor to execute one or more aspects of the memory systems 200 and methods of this disclosure.

The computer system 1100 may further include a display controller 1125 coupled to a display 1130. In some embodiments, the computer system 1100 may further include a network interface 1160 for coupling to a network 1165. The network 1165 may be an IP-based network for communication between the computer system 1100 and an external server, client and the like via a broadband connection. The network 1165 transmits and receives data between the computer system 1100 and external systems. In some embodiments, the network 1165 may be a managed IP network administered by a service provider. The network 1165 may be implemented in a wireless fashion, e.g., using wireless protocols and technologies, such as WiFi, WiMax, etc. The network 1165 may also be a packet-switched network such as a local area network, wide area network, metropolitan area network, the Internet, or other similar type of network environment. The network 1165 may be a fixed wireless network, a wireless local area network (LAN), a wireless wide area network (WAN) a personal area network (PAN), a virtual private network (VPN), intranet or other suitable network system and may include equipment for receiving and transmitting signals.

Memory systems 200 and methods according to this disclosure may be embodied, in whole or in part, in computer program products or in computer systems 1100, such as that illustrated in FIG. 11.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a first interface scheduler in communication with a memory controller, a first communication directed from the memory controller to a target component;
capturing the first communication before the first communication reaches the target component;
postponing the first communication for a first set of one or more memory cycles; and
reissuing the first communication to the target component in association with a first cycle offset code indicating how many memory cycles the first communication was postponed, wherein the first interface scheduler resides communicatively between the memory controller and a data chip in a distributed memory system, and wherein the capturing the first communication before the first communication reaches the target component comprises capturing a command before the command reaches the data chip.

2. The computer-implemented method of claim 1, wherein the cycle offset code indicates an offset useable to calculate a fixed delay until data arrives at the target component.

3. The computer-implemented method of claim 1, wherein the first interface scheduler resides communicatively between the memory controller and a host processor, and wherein the capturing the first communication before the first communication reaches the target component comprises capturing a response before the response reaches the host processor.

4. The computer-implemented method of claim 1, wherein the target component is a host processor, and the computer-implemented method further comprising:
receiving, by a second interface scheduler in communication with the memory controller, a second communication directed from the memory controller to a data chip of a distributed memory system;
capturing the second communication before the second communication reaches the data chip;
postponing the second communication for a second set of one or more memory cycles; and
reissuing the second communication to the data chip in association with a second cycle offset code indicating how many memory cycles the second communication was postponed.

5. The computer-implemented method of claim 1, wherein:
the capturing the first communication before the first communication reaches the target component comprises capturing a read response before the read response reaches a host processor;
the reissuing the first communication to the target component in association with the first cycle offset code comprises reissuing the read response to the host processor in association with the first cycle offset code; and
the first cycle offset code is useable by the host processor to determine when data on a high-speed serial link becomes valid.

6. The computer-implemented method of claim 1, wherein:
the capturing the first communication before the first communication reaches the target component com-
prises capturing the first communication before the first communication reaches a data chip in a distributed memory system;
the first communication is at least one of a fetch command, a store-from-buffer command, and a write-to-buffer command;
the reissuing the first communication to the target component in association with the first cycle offset code comprises reissuing the first communication to the data chip in association with the first cycle offset code; and
the first cycle offset code is useable by the data chip to determine when data on a data buffer control/communication link becomes valid.

7. The computer-implemented method of claim 1, wherein the memory controller is a dual-port memory controller.

8. An Address and Command chip (AC) in a distributed memory system, the AC comprising:
a memory controller;
a first communication link; and
one or more interface schedulers, comprising a first interface scheduler residing communicatively between the memory controller and the first communication link;
wherein the first interface scheduler is configured to:
receive a first communication directed from the memory controller to the first communication link;
capture the first communication before the first command reaches the first communication link;
postpone the first communication for a first set of one or more memory cycles; and
reissue the first communication to the first communication link in association with a first cycle offset code indicating how many memory cycles the first command was postponed, wherein the first communication link is a data buffer control/communication link to a data chip in a distributed memory system, and wherein the first interface scheduler is configured to capture the first communication before the first communication reaches the data chip.

9. The AC of claim 8, wherein the cycle offset code indicates an offset useable to calculate a fixed delay until data arrives at the target component.

10. The AC of claim 8, wherein the first communication link is a high-speed serial link to a host processor, and wherein the first interface scheduler is configured to capture the first communication before the first communication reaches the host processor.

11. The AC of claim 8, wherein first communication link is a high-speed serial link to a host processor, and the AC further comprising:
a data buffer control/communication (BCOM) link to a data chip of a distributed memory system; and
a second interface scheduler residing communicatively between the memory controller and the BCOM link;
wherein the second interface scheduler is configured to:
receive a command directed from the memory controller to the BCOM link;
capture the command before the command reaches the BCOM link;
postpone the command for a second set of one or more memory cycles; and
reissue the command to the BCOM link in association with a second cycle offset code indicating how many memory cycles the command was postponed.

12. The AC of claim 8, wherein:
the first communication is a read response;

the first communication link is a high-speed serial link to a host processor; and the first cycle offset code is useable by the host processor to determine when data on the high-speed serial link becomes valid.

13. The AC of claim 8, wherein:

the first command is at least one of a fetch command, a store-from-buffer command, and a write-to-buffer command;

the first communication link is a data buffer control/communication (BCOM) link to a data chip in a distributed memory system; and the first cycle offset code is useable by the data chip to determine when data on the BCOM link becomes valid.

14. A distributed memory system comprising:

a dynamic random-access memory (DRAM)

at least one data chip in communication with the DRAM; and an Address and Command chip (AC) in communication with the DRAM, the at least one data chip, and a host processor;

wherein the AC comprises:

a memory controller;

a first communication link; and one or more interface schedulers, comprising a first interface scheduler residing communicatively between the memory controller and the first communication link;

wherein the first interface scheduler is configured to:

receive a first communication directed from the memory controller to the first communication link;

capture the first communication before the first command reaches the first communication link;

postpone the first communication for a first set of one or more memory cycles; and reissue the first communication to the first communication link in association with a first cycle offset code indicating how many memory cycles the first command was postponed wherein the first communication link is a data buffer control/communication link to the data chip, and wherein the first interface scheduler is configured to capture the first communication before the first communication reaches the data chip.

15. The distributed memory system of claim 14, wherein the first communication link is a high-speed serial link to the host processor, and wherein the first interface scheduler is configured to capture the first communication before the first communication reaches the host processor.

16. The distributed memory system of claim 14, wherein first communication link is a high-speed serial link to a host processor, and wherein the AC further comprises:

a data buffer control/communication (BCOM) link to the data chip; and a second interface scheduler residing communicatively between the memory controller and the BCOM link;

wherein the second interface scheduler is configured to:

receive a command directed from the memory controller to the BCOM link;

capture the command before the command reaches the BCOM link;

postpone the command for a second set of one or more memory cycles; and reissue the command to the BCOM link in association with a second cycle offset code indicating how many memory cycles the command was postponed.

17. The distributed memory system of claim 14, wherein:

the first communication is a read response command;

the first communication link is a high-speed serial link to the host processor; and the first cycle offset code is useable by the host processor to determine when data on the high-speed serial link becomes valid.

* * * * *